United States Patent
Woods

(10) Patent No.: US 9,334,036 B1
(45) Date of Patent: *May 10, 2016

(54) WATER JACKETED MARINE EXHAUST COMPONENTS HAVING MULTIPLE STREAM SPRAY RING CONFIGURATIONS

(71) Applicant: Woodrow Woods, Riviera Beach, FL (US)

(72) Inventor: Woodrow Woods, Riviera Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,509

(22) Filed: Feb. 18, 2014

Related U.S. Application Data

(63) Continuation-in-part of application No. 13/156,867, filed on Jun. 9, 2011, now Pat. No. 8,651,907.

(60) Provisional application No. 61/352,849, filed on Jun. 9, 2010.

(51) Int. Cl.
    *F01N 13/12* (2010.01)
    *B63H 21/32* (2006.01)

(52) U.S. Cl.
    CPC ..................... *B63H 21/32* (2013.01)

(58) Field of Classification Search
    CPC ........... F01N 3/04; F01N 3/043; F01N 3/046; F01N 13/004; F01N 13/082; F01N 13/12; F01N 2470/24; F01N 2590/021; F01N 2590/022; F01N 1/083; F01N 1/085; F01N 2270/00; F01N 2270/02; F01N 2270/06; F01N 2270/08; F01N 2590/02; B63H 20/24; B63H 20/245; B63H 21/32; B63H 21/34
See application file for complete search history.

(56) References Cited

U.S. PATENT DOCUMENTS

| | | | |
|---|---|---|---|
| 3,190,254 A * | 6/1965 | Meibauer | 440/66 |
| 5,536,189 A * | 7/1996 | Mineo | 440/89 R |
| 5,740,670 A | 4/1998 | Woods | |
| 6,035,633 A | 3/2000 | Woods | |
| 2005/0142959 A1* | 6/2005 | Mitchell | 440/89 R |
| 2005/0215133 A1* | 9/2005 | Abdel-Maksoud et al. | 440/89 R |

* cited by examiner

*Primary Examiner* — Jonathan Matthias
(74) *Attorney, Agent, or Firm* — Mark D. Bowen; Malin Haley DiMaggio & Bowen, P.A.

(57) ABSTRACT

A water jacketed exhaust component includes an exhaust pipe having a radially inwardly tapered tail end, a water jacket disposed in surrounding relation with the exhaust pipe, and a generally V-shaped spray ring. The spray ring includes a first and second set of apertures that create diverging streams of cooling water. A first set of apertures creates an annularly disposed series of streams that are directed downstream and radially inward. These streams are generally directed toward the outer surface of the exhaust pipe structure which extends downstream of the spray ring. A second set of apertures creates an annularly disposed series of streams that are directed downstream and radially outward. These streams are generally directed toward the inner surface of the water jacket structure extending downstream of the spray ring. By providing a water jacketed exhaust component with a spray ring that creates diverging streams of cooling water, the present invention provides a water jacketed marine exhaust component that provides improved exhaust gas cooling over a wider range of engine operating conditions. An alternate embodiment includes a V-shaped spray ring configured to create converging streams of cooling water.

8 Claims, 16 Drawing Sheets

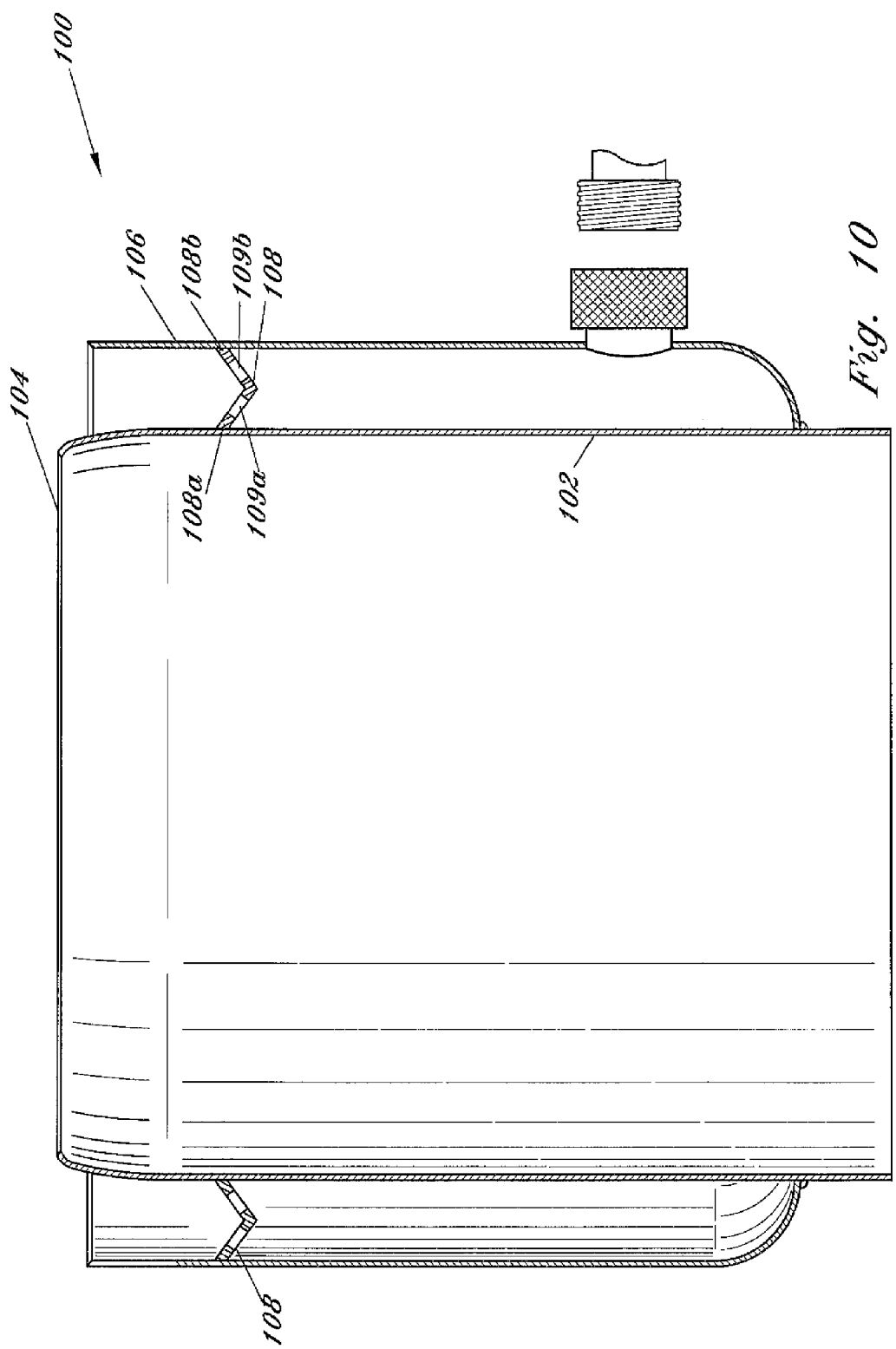

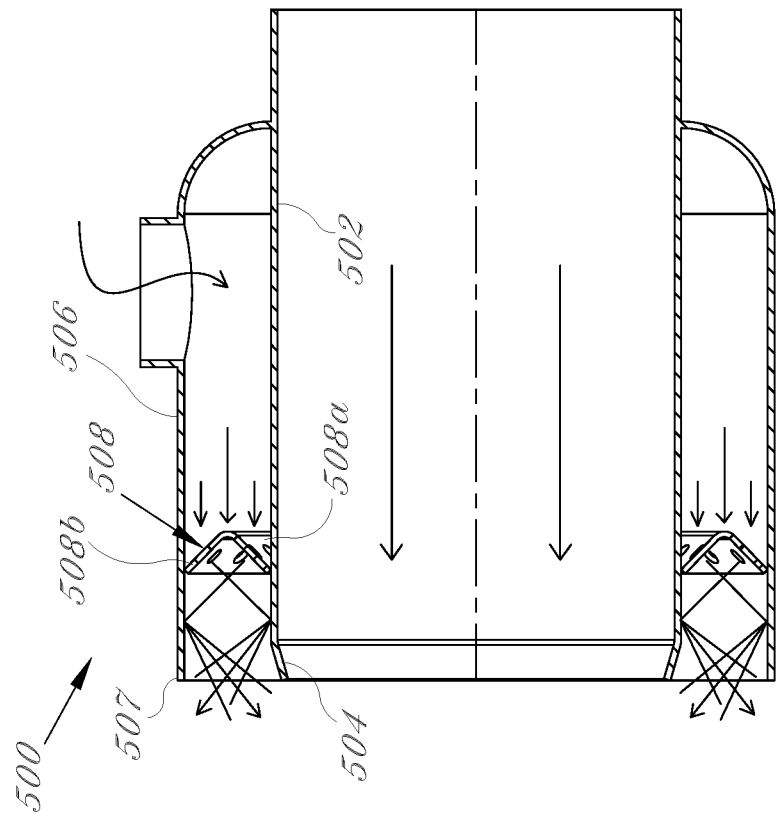
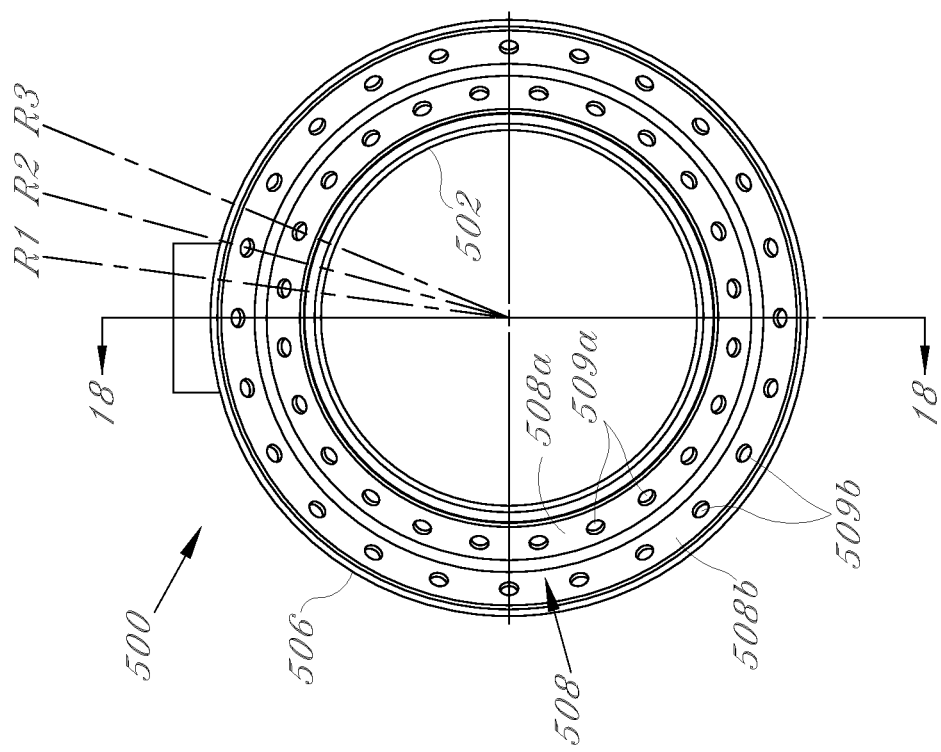

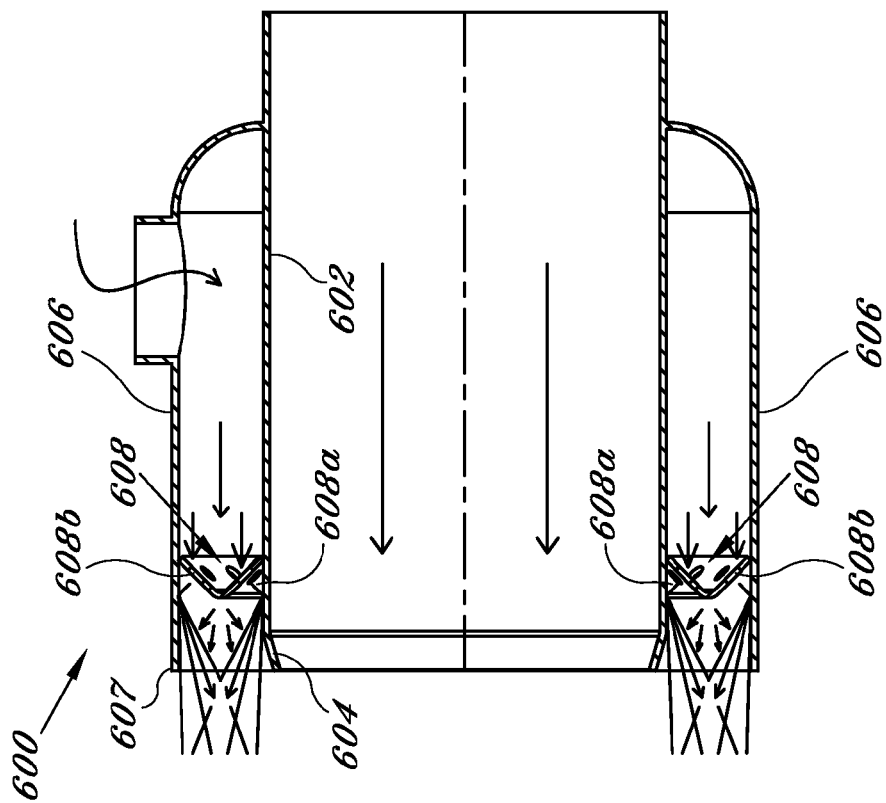
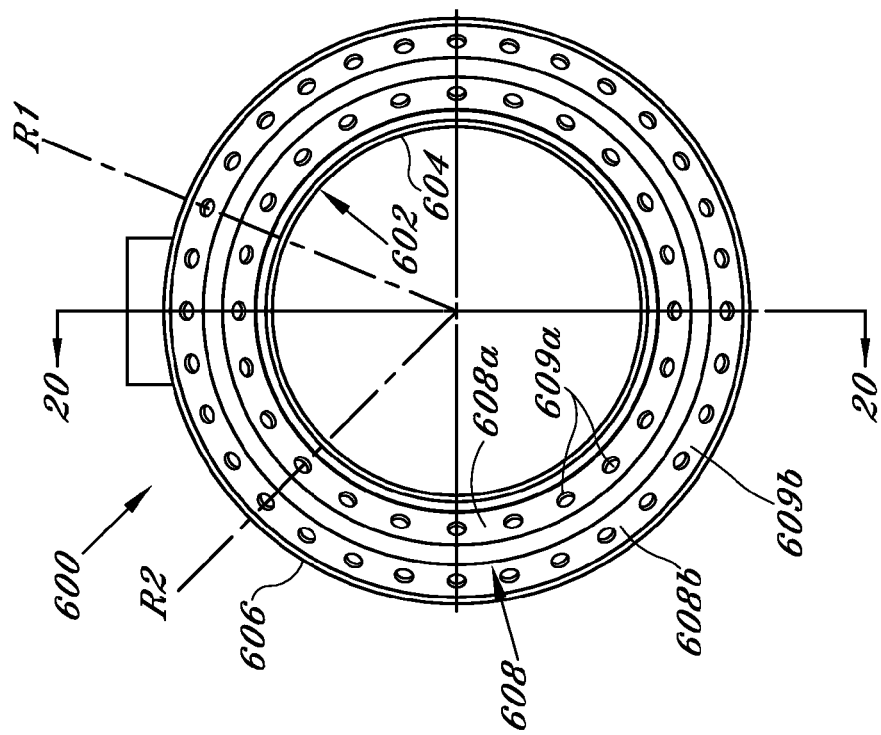

WATER JACKETED MARINE EXHAUST COMPONENTS HAVING MULTIPLE STREAM SPRAY RING CONFIGURATIONS

CROSS REFERENCE TO RELATED APPLICATIONS

This application is a continuation-in-part of U.S. patent application Ser. No. 13/156,867, filed on Jun. 9, 2011, which claims the benefit of provisional U.S. Patent Application Ser. No. 61/352,849, filed on Jun. 9, 2010.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to marine exhaust components, and more particularly to water jacketed marine exhaust pipes that function to mix exhaust gas and cooling water for the purpose of cooling the exhaust gas so as to prevent heat damage to downstream exhaust components.

2. Description of Related Art

Marine engines are cooled by water which is drawn from the body of water in which the vessel is operating (e.g. ocean, lake, etc.). After having cooled the engine, the water is typically discharged into the exhaust gas stream via a water jacketed exhaust component (a/k/a Water Can) to further cool the engine exhaust. Preferably, the exhaust is cooled as far upstream as possible to reduce thermal stress (i.e. overheating) on the downstream exhaust system components. FIGS. 1-4 depict examples of prior art marine exhaust system water cans. The typical arrangement employs a water jacketed exhaust component 2 having an exhaust pipe 4, a water jacket 6 disposed in surrounding relation with exhaust pipe 4, and a spray ring 8. The water jacketed exhaust component is typically mounted downstream of the turbocharger and receives exhaust gas and cooling water from the marine engine. Exhaust gas, referenced "E", flows through exhaust pipe 4, and cooling water, referenced "W", flows through the volume 5 between the outer surface of the exhaust pipe 4 and the inner surface of the water jacket 6 and is ejected via apertures 9 in spray ring 8. Generally, the spray ring 8 contains a plurality of apertures 9 from which the cooling water is ejected under pressure from the water pump in the form of a spray or stream.

The prior art water jacketed exhaust component shown in FIG. 1 was burdened by a number of significant problems, and is not in widespread use. First, the water stream exiting the spray ring was generally streamed along only the outer circumference of the volume of exhaust gas flow as shown in FIG. 1. That spray pattern resulted in a poor mixture of cooling water and exhaust gas and thus poor heat exchange. As a result, the exhaust system components downstream of the tail end of the water jacketed exhaust component 2 were subjected to excessive exhaust gas temperatures. An additional shortcoming present with the prior art water jacketed exhaust component shown in FIG. 1, was corrosion. Specifically, the present inventor determined that narrow band of boundary layer turbulent flow along the inner surface of the exhaust pipe 4 was creating a counter flow that caused cooling water to migrate upstream, i.e. opposite the direction of exhaust gas flow. As a result of this upstream migration of cooling water (typically salt water) exhaust gas chemicals such as hydrogen-sulfide and carbon were chemically reacting with the chloride ions produced from the heated salt water to form acid, including sulfuric acid which became deposited on the inner surface of exhaust pipe 4. Over time, this acid corroded the water jacketed exhaust component. Accordingly there existed a need for an improved water jacketed exhaust pipe that provided a superior mixture of cooling water and exhaust gas, while preventing the upstream migration of cooling water.

In response to those problems in the art, the present inventor provided significant advancements in the art of marine water jacketed exhaust components as shown in FIGS. 2-4. In U.S. Pat. Nos. 5,740,670 and 6,035,633, the disclosures of which are incorporated herein by reference, the present inventor disclosed water jacketed exhaust components wherein the tail end of the exhaust pipe (inner liner) were inwardly tapered to clip the turbulence that occurs along the inner walls so that cooling water would not migrate upstream thereby significantly reducing corrosion of the exhaust pipe. In addition, the tail end of the water jacket (outer shell) was inwardly tapered so as to direct and deflect cooling water into the exhaust gas stream thereby improving heat transfer between the hot exhaust gas and the cooling water. Finally, a backward inclined or angled spray ring was disclosed whereby cooling water could be directed toward the outer shell such whereby a portion of the water would be deflected back toward the outer surface of the exhaust pipe, while the remaining portion flowed along the inner surface of the outer shell. The redirected water particles are easily vaporized and in the process, extract a significant amount of heat from the exhaust gases. In addition, the prior art reveals water cans having forward inclined spray rings for directing water downstream and radially inward.

As used herein the term "backward inclined", in the context of spray ring structure, means that portion of the spray ring structure that projects in a radially outward and upstream (relative to cooling water flow) direction as shown in FIG. 3. Similarly, the tem' "forward inclined", in the context of spray ring structure, means that portion of the spray ring structure that projects in a radially outward and downstream direction as shown in FIG. 4.

In addition, FIG. 5 illustrates a known prior art water can manufactured by DeAngelo Marine Exhaust, Inc. in Ft. Lauderdale, Fla. The DeAngelo water can has a forward inclined spray ring with a first series of peripheral notches defining a first set of passageways and a second series of apertures, disposed radially inward from said notches, defining a second set of passageways.

Water jacketed exhaust components incorporating the many advancements developed by the present inventor and disclosed in the '670 and '633 patents have met with widespread success and use in the marine industry and are believed to represent the current state of the art. Marine engines, however, operate over a wide power range, e.g. from idle (low RPM) to full throttle (high RPM), and the respective volume flow of cooling water and exhaust gas produced by a marine engine generally varies in direct proportion to throttle setting, with minimal volume flow of cooling water and exhaust gas at idle, and a maximum volume flow at full throttle. As a result, the water jacketed exhaust components must be sized with particular care in order to perform satisfactorily over all operating ranges.

It has been found that the substantial variations in exhaust gas and cooling water flow rates over the wide range of operating conditions present the exhaust system designer with challenges in sizing a water jacketed exhaust component that performs satisfactorily in operating ranges from idle to full throttle. If the water jacketed component is undersized it will result in excessive raw cooling water backpressure at full throttle that ultimately will result in premature failure of the vessel's water pump. If the water jacketed component is oversized it will result in low cooling water flow velocity, particularly at low RPM, resulting high exhaust gas temperatures. Thus, the water can must be sized with a proper diameter exhaust pipe to maintain desired exhaust gas velocity without creating excessive backpressure on the exhaust side. Furthermore, the water can must be sized with a proper number, size, and location of spray ring apertures to create adequate exhaust gas cooling without creating excessive backpressure on the raw cooling water side.

Accordingly, there exists a need for an improved water jacketed exhaust component that is capable of effectively cooling exhaust gases over a wide range of operating conditions.

BRIEF SUMMARY OF THE INVENTION

The present invention overcomes the limitations and disadvantages in the art by providing an improved water jacketed marine exhaust component incorporating a novel spray ring adapted to create diverging streams of raw cooling water, including a first annularly disposed series of streams that are directed downstream and radially inward and a second annularly disposed series of streams that are directed downstream and radially outward. By providing a water jacketed exhaust component with a spray ring that creates diverging streams of cooling water, the present invention provides a marine exhaust water can that provides improved exhaust gas cooling over a wide range of engine operating conditions.

A water jacketed exhaust component in accordance with the present invention includes a an exhaust pipe having a radially inwardly tapered tail end, a water jacket pipe disposed in concentrically surrounding and spaced relation with the exhaust pipe, and a generally V-shaped spray ring. The V-shaped spray ring includes a first and second legs defining apertures that create diverging streams of cooling water. A first set of apertures creates an annularly disposed series of streams that are directed downstream and radially inward. These streams are generally directed toward the outer surface of the exhaust pipe structure which extends downstream of the spray ring. A second set of apertures creates an annularly disposed series of streams that are directed downstream and radially outward. These streams are generally directed toward the inner surface of the water jacket structure extending downstream of the spray ring. In an alternate embodiment, the spray ring is reversed so as to create converging streams of cooling water. The alternate embodiment may be configured with offset apertures to prevent the converging streams from colliding with one another.

Accordingly, it is an object of the present invention to provide an improved water jacketed marine exhaust component.

Another object of the present invention is to provide a water jacketed marine exhaust component that provides improved cooling over a wide range of engine operating conditions.

Still another object of the present invention is to provide a water jacketed marine exhaust component that provides improved cooling over a wide range of engine operating conditions through the use of a spray ring the creates diverging streams of cooling water.

These and other objects are met by the present invention which will become more apparent from the accompanying drawing and the following detailed description of the drawings and preferred embodiments.

BRIEF DESCRIPTION OF THE SEVERAL VIEWS OF THE DRAWINGS

FIG. 10 is an alternate sectional illustration thereof;

FIG. 17 is a discharge end view of a water jacketed marine exhaust component in accordance with a sixth alternate embodiment;

FIG. 18 is a side sectional view thereof taken along section line 18-18 in FIG. 17;

FIG. 19 is a discharge end view of a water jacketed marine exhaust component in accordance with a seventh alternate embodiment;

FIG. 20 is a side sectional view thereof taken on section line 20-20 in FIG. 19;

DETAILED DESCRIPTION OF THE INVENTION

Figure 1:
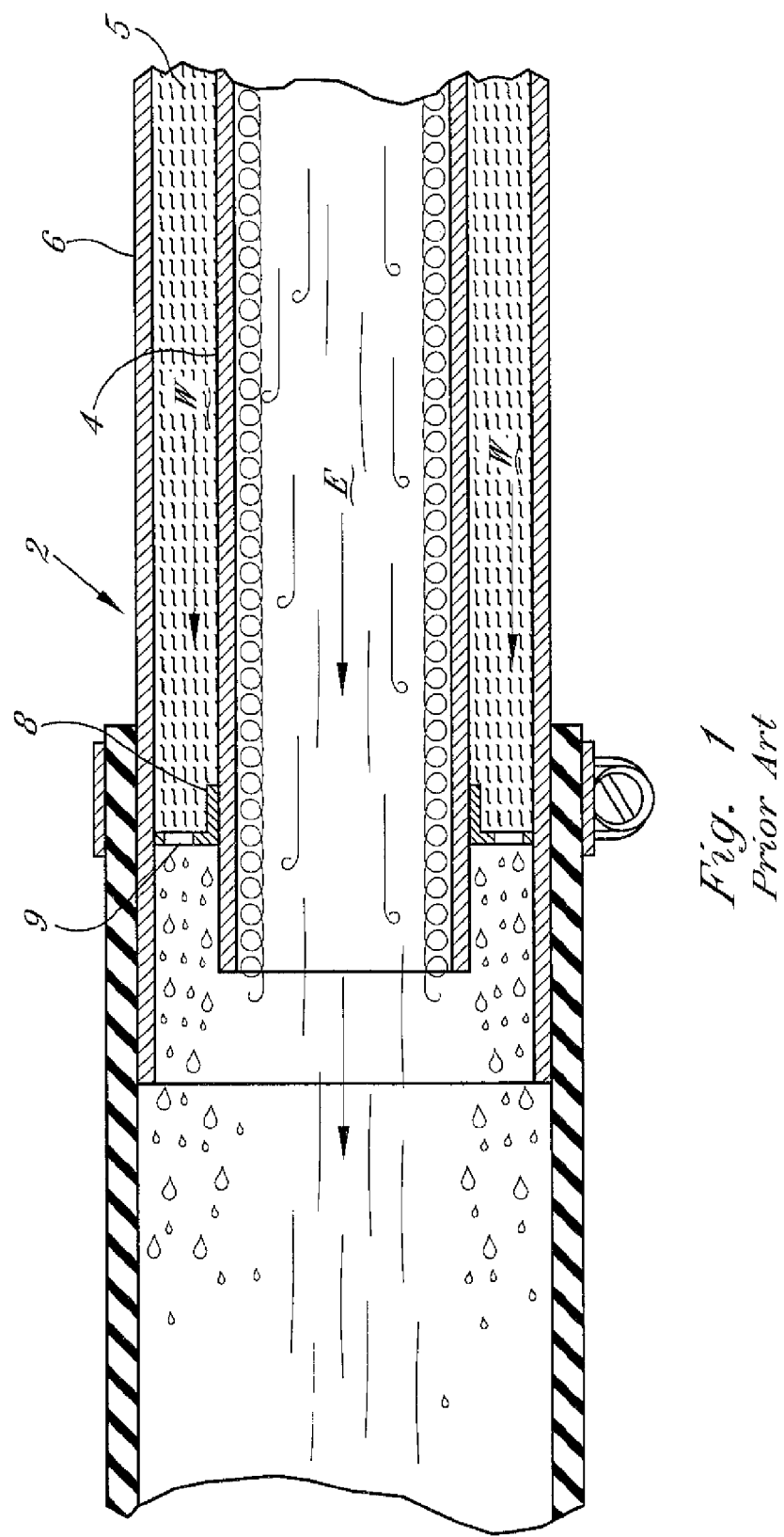
FIG. 1 depicts side sectional view of water jacketed marine exhaust component in accordance with the prior art.
Figure 2:
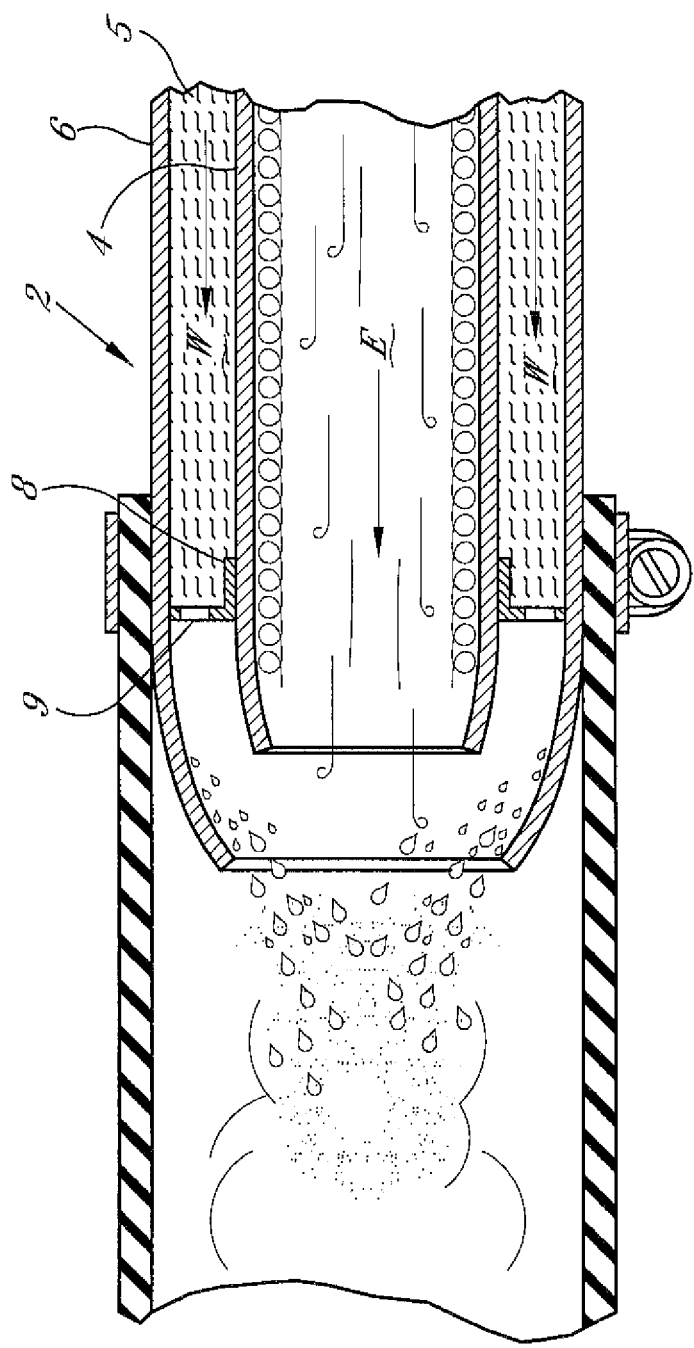
FIGS. 2-4 depict side sectional views of prior art water jacketed marine exhaust components disclosed by the present inventor in U.S. Pat. Nos. 5,740,670 and 6,035,633.
Figure 3:
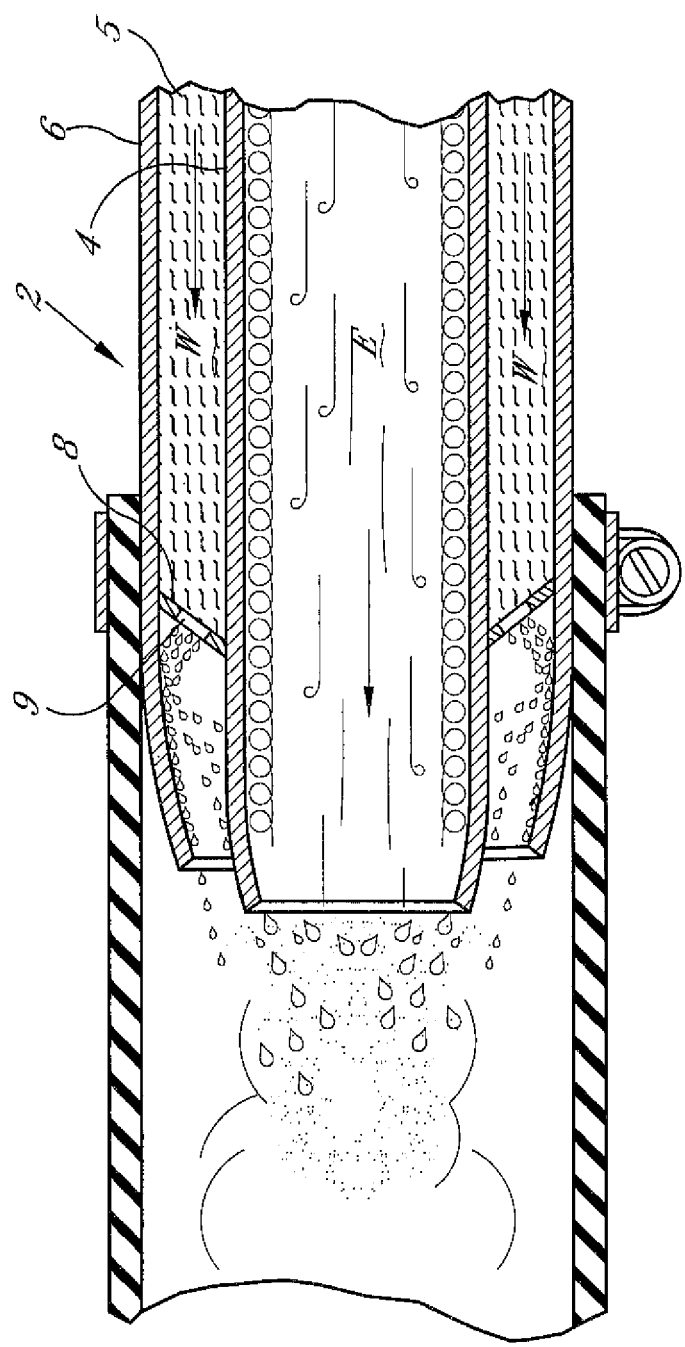
Figure 4:
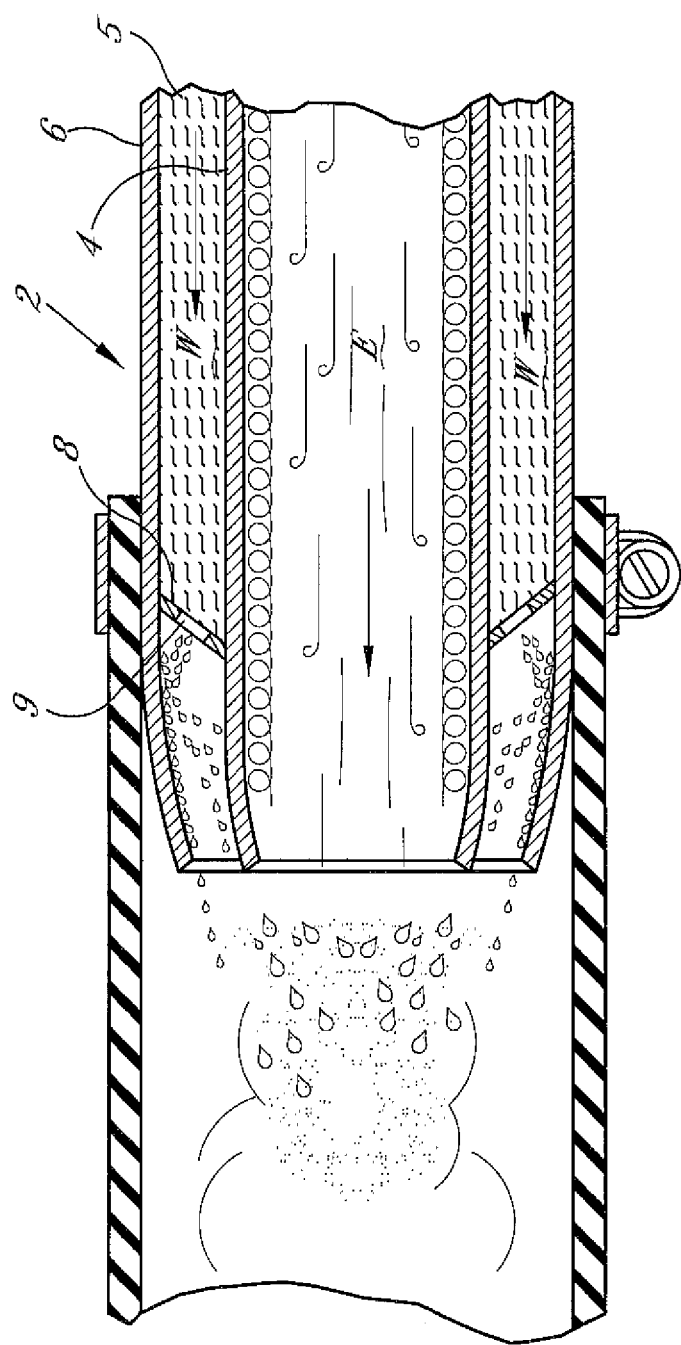
Figure 5:
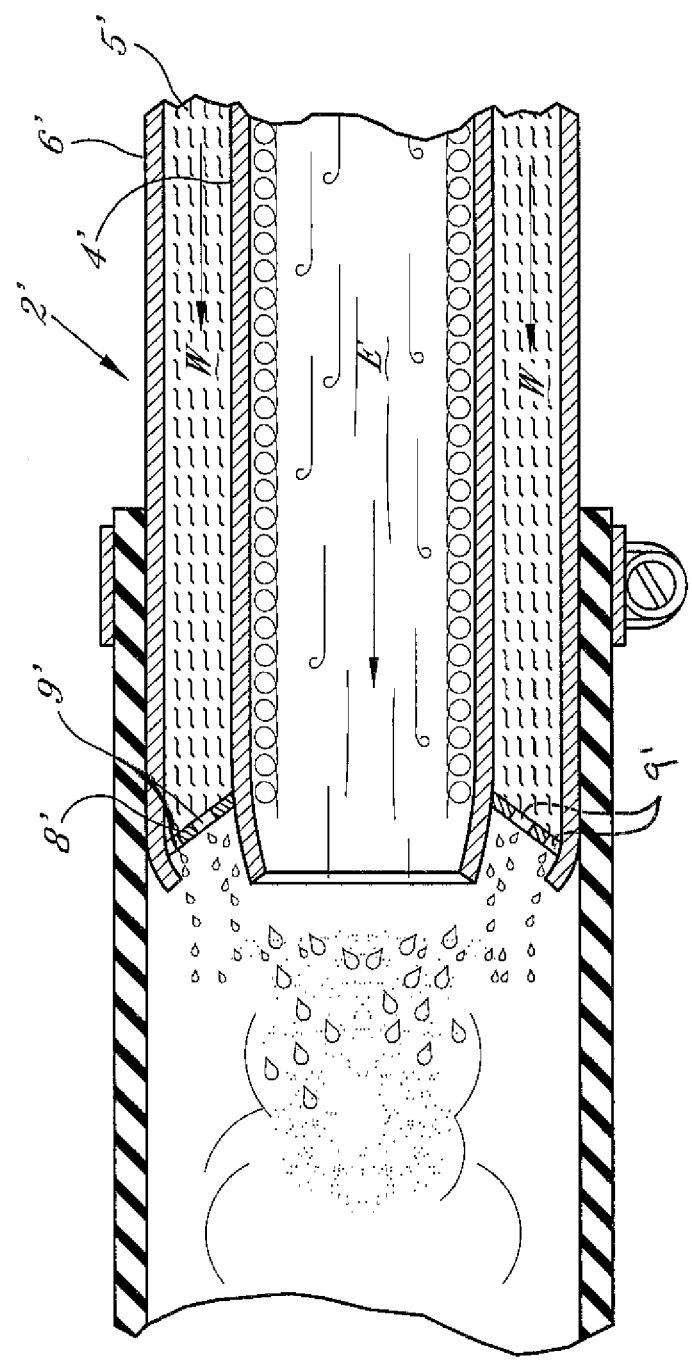
FIG. 5 depicts a side sectional view of another prior art water jacketed marine exhaust component.
Figure 6:
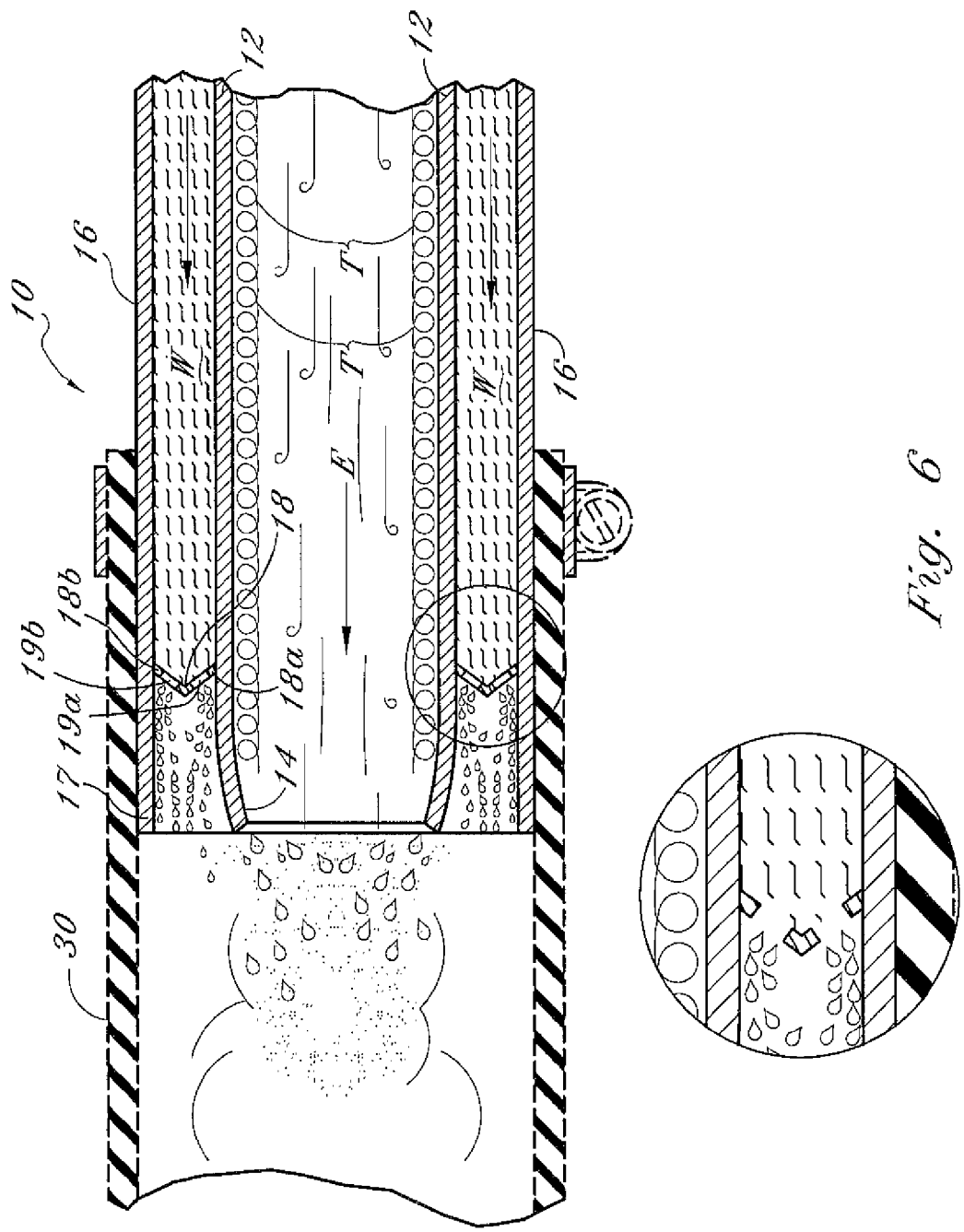
FIG. 6 depicts a side sectional view of a water jacketed marine exhaust component in accordance with the present invention.
Figure 7:
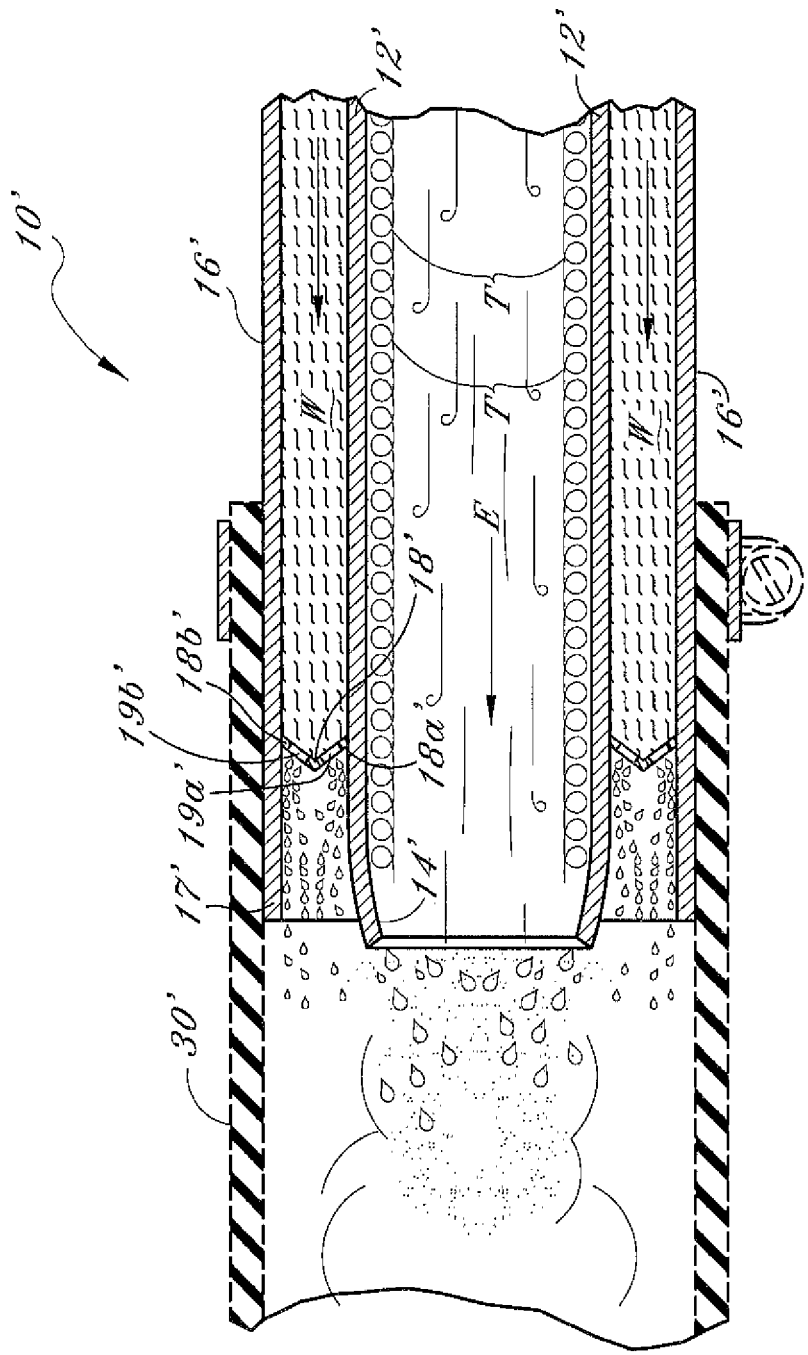
FIG. 7 depicts a side sectional view of an alternate embodiment water jacketed marine exhaust component in accordance with the present invention

With reference to the drawings, FIGS. 6-18 depict preferred and alternate embodiments of water jacketed marine exhaust components in accordance with the present invention. Turning first to FIG. 6 there is depicted a water jacketed exhaust component, generally referenced as 10, in accordance with the present invention. Water jacketed exhaust component 10 includes an exhaust pipe 12 forming an inner liner having a radially inwardly tapered tail end 14, a water jacket 16, having a tail end 17, forming an outer shell disposed in surrounding relation with exhaust pipe 12, and a generally V-shaped spray ring 18. Water jacketed exhaust component 10 is preferably fabricated from a corrosion resistant metal or metal alloy, but may be fabricated from any suitable material having desired heat and corrosion resistance properties. In a preferred embodiment tail end 14 terminates either coextensive with or downstream from the tail end 17 of water jacket 16. FIG. 6 depicts an embodiment with tail end 14 terminating generally coextensive with the tail end 17 of water jacket 16, and FIG. 7 depicts an alternate embodiment with tail end 14' extending downstream and beyond the tail end 17' of water jacket 16'.

As is common with marine exhaust water cans, exhaust gas generated by an internal combustion marine engine, referenced as "E", flows through exhaust pipe 12, and cooling water, referenced as "W", which is typically drawn from the body of water in which the vessel is operating, is pumped through the volume defined between the exhaust pipe 12, water jacket 16, and spray ring 18. A significant aspect of the present invention involves providing a novel, generally V-shaped spray ring 18. More particularly, spray ring 18 comprises an annular structure that defines a generally sideways oriented V-shaped cross-section including a forward inclined leg 18a and a backward inclined leg 18b. Forward inclined leg 18a is connected to, or generally engages, the outer surface of exhaust pipe 12, such as by welded connection, to form a generally fluid tight seal therewith. Backward inclined leg 18b is connected to, or generally engages, the inner surface of water jacket 16, such as by welded connection, to form a generally fluid tight seal therewith. While welding of the spray ring 18 to the water can structure is a preferred method of affixation, any suitable means of attachment is considered within the scope of the present invention.

As best illustrated in FIG. 6, a significant aspect of the present invention includes providing a spray ring 18 having a forward inclined leg 18a and a backward inclined leg 18b, each of which defines a series of apertures such that spray ring 18 creates diverging streams of cooling water. Forward inclined leg 18a is generally disposed radially inward relative to backward inclined leg 18b. A first set of apertures 19a are defined on forward inclined leg 18a in annularly spaced relation and function to create an annularly disposed series of cooling water streams that are directed toward the outer surface of the exhaust pipe structure 12 which extends downstream of the spray ring 18. A second set of apertures 19b are defined on the backward inclined leg 18b in annularly spaced relation and function to create an annularly disposed series of cooling water streams that are directed downstream and radially outward. In a preferred embodiment apertures 19a and 19b are circular, however, in a contemplated alternate embodiment the apertures may be non-circular, such as half-moon shape, slits, or any other suitable shaped. In addition, apertures 19a and 19b may be disposed generally mid-length on each leg, or alternately may be positioned at various positions along each leg, including at the extreme peripheral edge. Those streams are generally directed toward the inner surface of the water jacket 16 structure extending downstream of the spray ring. Water exiting apertures 19a preferably impacts the outer surface of exhaust pipe 12 whereby the water is broken into fine particles. Water exiting apertures 19b preferably impacts the inner surface of water jacket 16 whereby the water is broken into fine particles. The present invention thus provides a flow of fine water particles introduced into the exhaust gas flow ("E") thereby maximizing heat transfer from the exhaust gas resulting in maximal cooling thereof.

In accordance with a preferred embodiment, apertures 19a and 19b are annularly and/or angularly offset. For example, apertures 19a and 19b are preferably offset such that, when viewed looking upstream, each aperture 19a is generally circumferentially disposed between opposing apertures 19b. Providing apertures 19a and 19b in an annularly offset configuration has been found to increase the mixing of cooling water with the exhaust gas stream thereby improving cooling. More particularly, it has been found that streams of water exiting from adjacent apertures 19a contacts the outer surface of exhaust pipe 12, fan out circumferentially across the surface until the streams collide thereby causing a radially projecting/splashing effect that further functions to disperse the water into fine droplets. By providing a water jacketed exhaust component with a spray ring that creates diverging streams of cooling water, the present invention provides a marine exhaust water can that provides improved exhaust gas cooling over a wider range of engine operating conditions than devices found in the background art.

Figure 8:
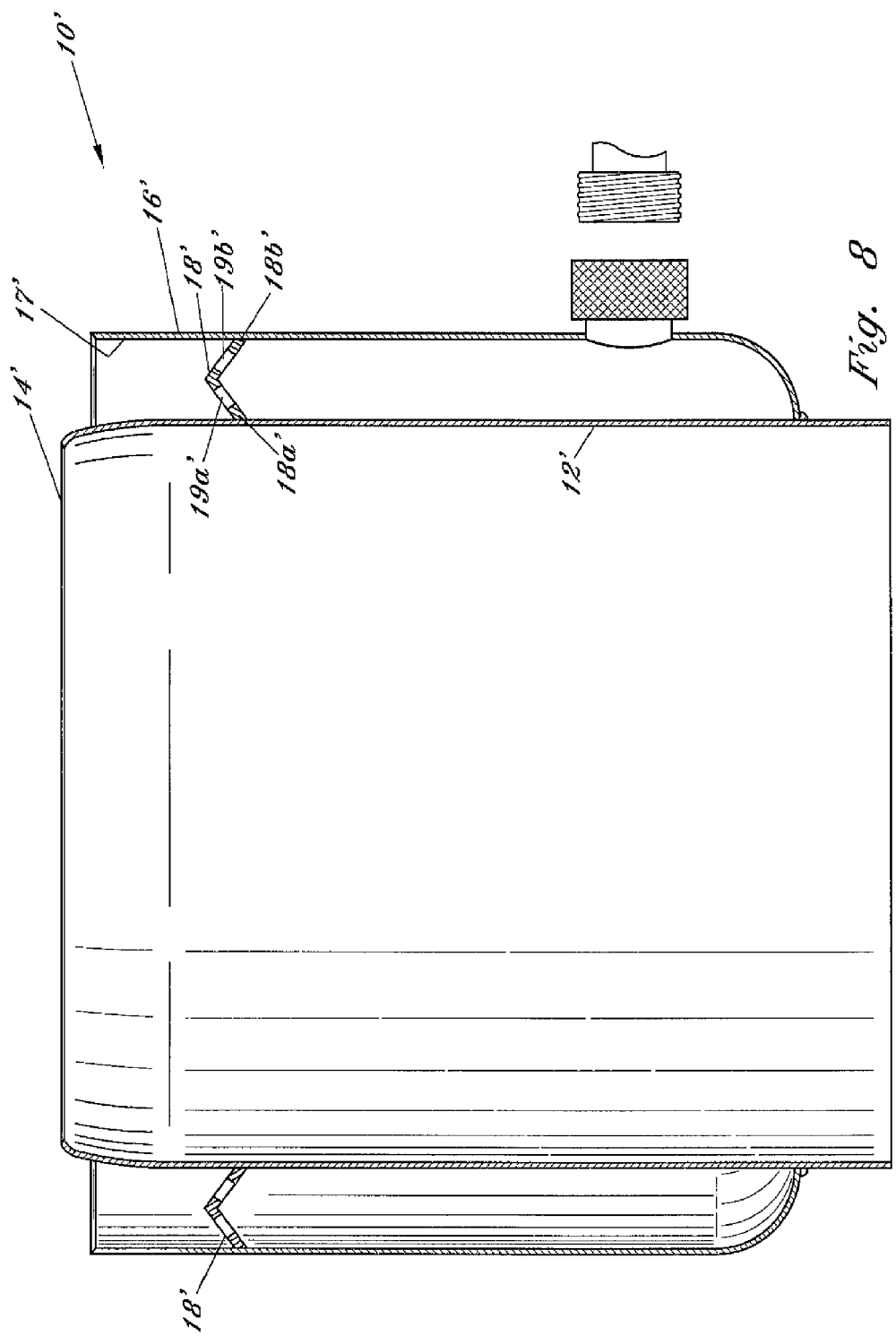
FIG. 8 is an alternate sectional illustration thereof.

FIG. 7 depicts an alternate embodiment water jacketed exhaust component, referenced as 10', in accordance with the present invention, and FIG. 8 presents an alternate illustration of a commercial embodiment thereof. Water jacketed exhaust component 10' includes an exhaust pipe 12' forming an inner liner having a radially inwardly tapered tail end 14', a water jacket 16', having a tail end 17', forming an outer shell disposed in surrounding relation with exhaust pipe 12', and a generally V-shaped spray ring 18'. Exhaust component 10' depicted in FIG. 6 is structured such that the tail end 14' of exhaust pipe 12' extends beyond the tail end 17' of water jacket 16'. This structure has been found to be effective in preventing the upstream migration of cooling water into exhaust pipe 12'. The spray ring 18' has a forward inclined leg 18a' and a backward inclined leg 1819', each of which defines a series of apertures such that spray ring 18' creates diverging streams of cooling water. Forward inclined leg 18a' is generally disposed radially inward of backward inclined leg 18b'. A first set of apertures 19a' are defined on forward inclined leg 18a' in annularly spaced relation and function to create an annularly disposed series of cooling water streams that are directed downstream and radially inward. Those streams are generally directed toward the outer surface of the exhaust pipe structure 12' which extends downstream of the spray ring 18'. A second set of apertures 19b' are defined on the backward inclined leg 1813' in annularly spaced relation and function to create an annularly disposed series of cooling water streams that are directed downstream and radially outward. Those streams are generally directed toward the inner surface of the water jacket structure extending downstream of the spray ring. In accordance with a preferred embodiment, apertures 19a' and 19b' are annularly offset.

Figure 9:
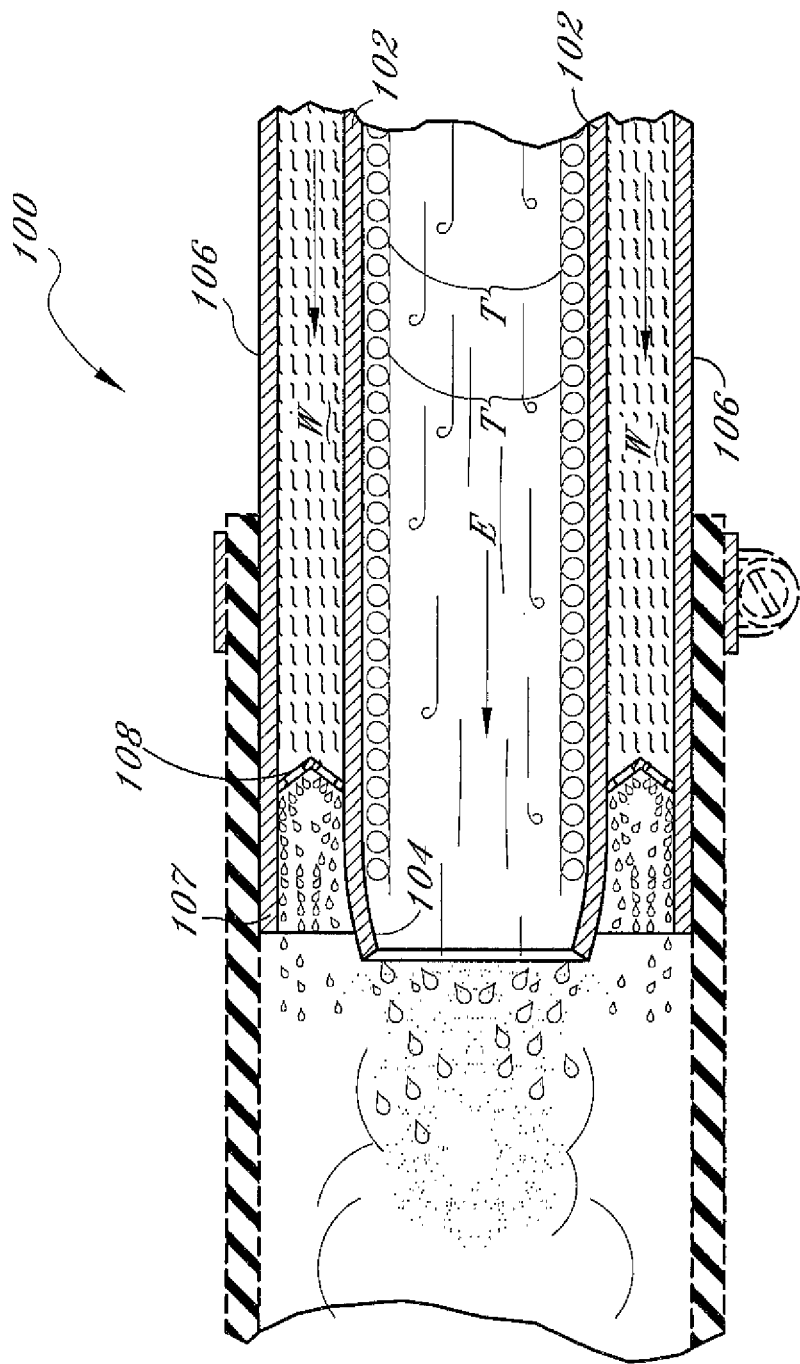
FIG. 9 depicts a side sectional view of a water jacketed marine exhaust component in accordance with a second alternate embodiment.

FIG. 9 depicts another alternate embodiment water jacketed exhaust component, referenced as 100, in accordance with the present invention, and FIG. 10 presents an alternate illustration of a commercial embodiment thereof. Water jacketed exhaust component 100 includes an exhaust pipe 102 forming an inner liner having a radially inwardly tapered tail end 104, a water jacket 106, having a tail end 107, forming an outer shell disposed in surrounding relation with exhaust pipe 102, and a generally V-shaped spray ring 108. This embodiment differs from the previously disclosed embodiments in that spray ring 108 is reversed so as to create converging streams of cooling water.

As best illustrated in FIGS. 9 and 10, a significant aspect of the present invention includes providing a spray ring 108 having a backward inclined leg 108a and a forward inclined leg 108b, each of which defines a series of apertures such that spray ring 108 creates converging streams of cooling water projected downstream. Backward inclined leg 108a is generally disposed radially inward of forward inclined leg 18b. A first set of apertures 109a are defined on backward inclined leg 108a in annularly spaced relation and function to create an annularly disposed series of cooling water streams that are directed downstream and radially outward. Those streams are generally directed toward the inner surface of the water jacket structure 106 which extends downstream of the spray ring 108. A second set of apertures 109b are defined on the forward inclined leg 108b in annularly spaced relation and function to create an annularly disposed series of cooling water streams that are directed downstream and radially inward. Those streams are generally directed toward the outer surface of the exhaust pipe 102 that extends downstream of the spray ring 108. In accordance with a preferred embodiment, apertures 109a and 109b are annularly offset. Providing apertures 19a and 19b in an annularly offset configuration has been found to increase the mixing of cooling water with the exhaust gas stream thereby improving cooling. By providing a water jacketed exhaust component with a spray ring that creates converging streams of cooling water, the present invention provides a marine exhaust water can that provides improved exhaust gas cooling over a wider range of engine operating conditions than devices found in the background art.

Finally, although the water jackets 16, 16', and 106, are illustrated as having generally cylindrical tail ends (e.g. downstream ends), those ends may also be formed with a radially d taper.

Figure 12:
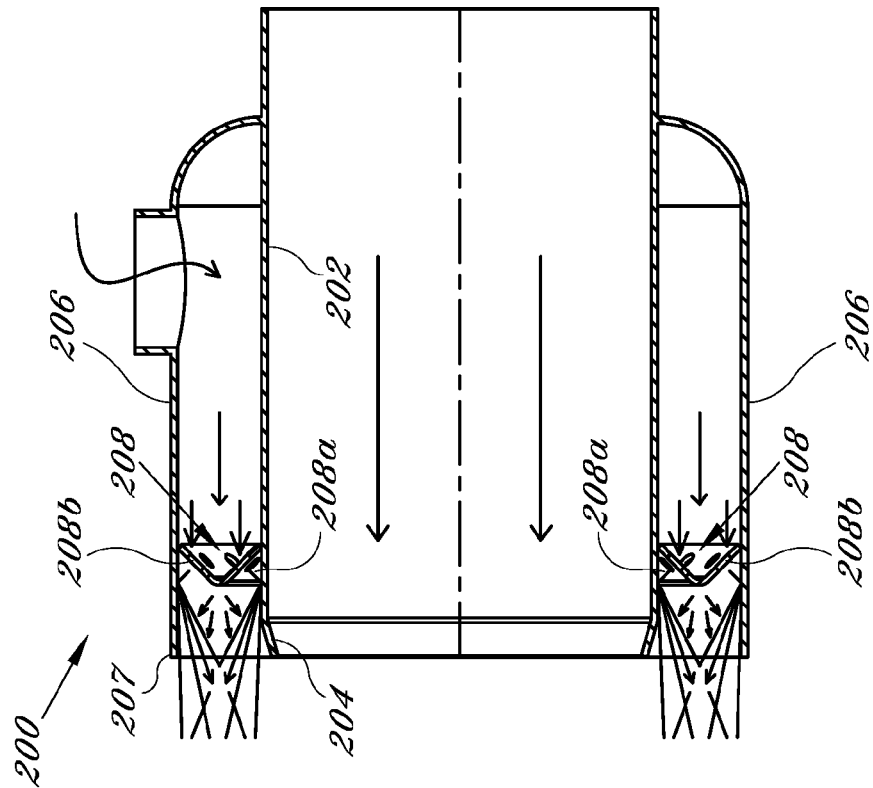
FIG. 12 is a side sectional view thereof taken along section line 12-12 in FIG. 11.
Figure 11:
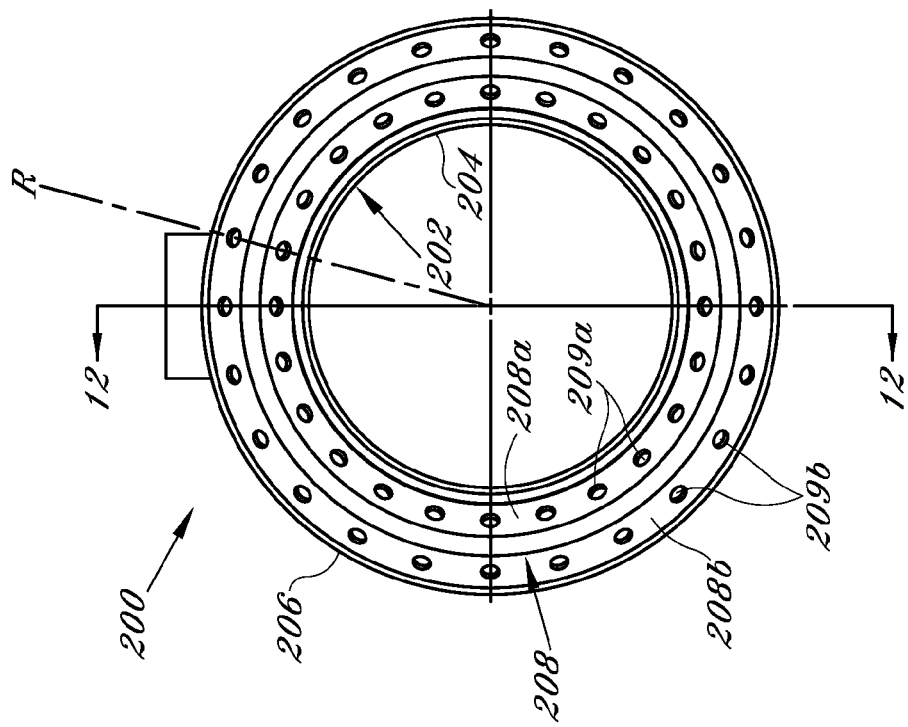
FIG. 11 is a discharge end view of a water jacketed marine exhaust component in accordance with a third alternate embodiment.

FIGS. 11 and 12 provide alternate embodiment illustrations similar to the embodiment disclosed in FIG. 6. FIGS. 11 and 12 depict a water jacketed exhaust component 200 includes an exhaust pipe, generally referenced as 202, forming an inner liner having a radially inwardly tapered tail end 204, a water jacket 206, having a tail end 207, forming an outer shell disposed in surrounding relation with exhaust pipe 202, and a generally V-shaped spray ring, generally referenced as 208. In this embodiment the apex of the V-shaped spray ring is pointed downstream. V-shaped spray ring 208 comprises an annular structure that defines a generally sideways oriented V-shaped cross-section including a radially inward forward inclined leg 208a and a radially outward backward inclined leg 208b. As best illustrated in FIG. 11, V-shaped spray ring 208, and particularly forward inclined leg 208a and a backward inclined leg 208b, defines a plurality of water spray apertures, generally referenced as 209. More particularly, forward inclined leg 208a defines a series of apertures 209a disposed in spaced relation along the circumference thereof, and backward inclined leg 208b defines a series of apertures 209b disposed in spaced relation along the circumference thereof. In this embodiment, each of apertures 209a and 209b are disposed in radially-aligned/angularly-aligned relation as illustrated by the broken radial reference line "R" in FIG. 11. This configuration has been found to create water flow spray patterns that enhance exhaust gas cooling in certain applications.

Figures 13, 14:
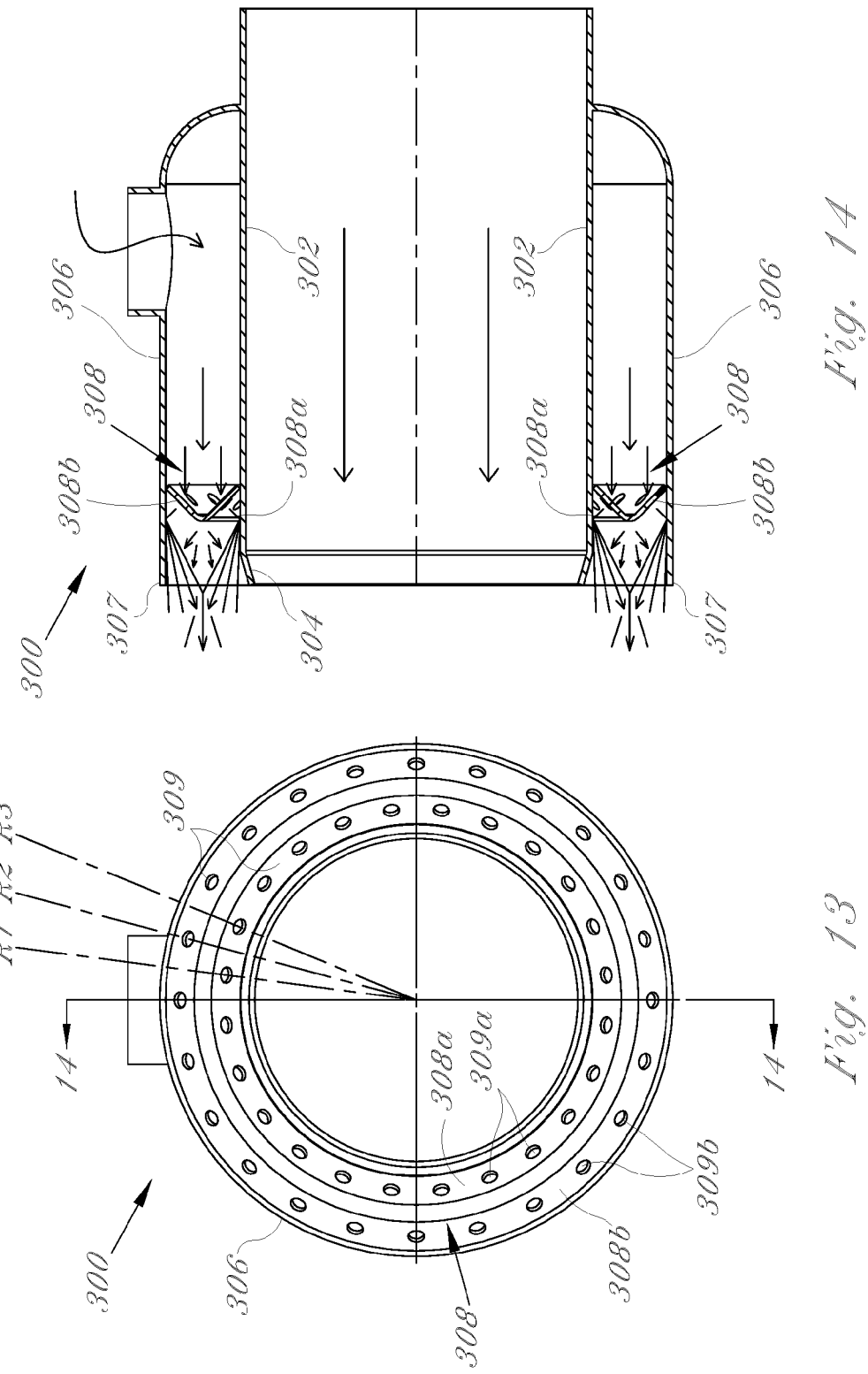
FIG. 13 is a discharge end view of a water jacketed marine exhaust component in accordance with a fourth alternate embodiment.
FIG. 14 is a side sectional view thereof taken along section line 14-14 in FIG. 13.

FIGS. 13 and 14 depict a water jacketed exhaust component 300 that includes an exhaust pipe, generally referenced as 302, forming an inner liner having a radially inwardly tapered tail end 304, a water jacket 306, having a tail end 307, forming an outer shell disposed in surrounding relation with exhaust pipe 302, and a generally V-shaped spray ring, generally referenced as 308. In this embodiment the apex of the V-shaped spray ring is pointed downstream. V-shaped spray ring 308 comprises an annular structure that defines a generally sideways oriented V-shaped cross-section including a forward inclined leg 308a and a backward inclined leg 308b. As best illustrated in FIG. 13, V-shaped spray ring 308, and particularly forward inclined leg 308a and a backward inclined leg 308b, defines a plurality of water spray apertures, generally referenced as 309. More particularly, forward inclined leg 308a defines a series of apertures 309a disposed in spaced relation along the circumference thereof, and backward inclined leg 308b defines a series of apertures 309b disposed in spaced relation along the circumference thereof. In this embodiment, each of apertures 309a and 309b are disposed in radially offset angularly offset relation as illustrated by the broken radial reference lines "R1", d "R3" in FIG. 13. This configuration has been found to create water flow spray patterns that enhance exhaust gas cooling in certain applications.

Figure 16:
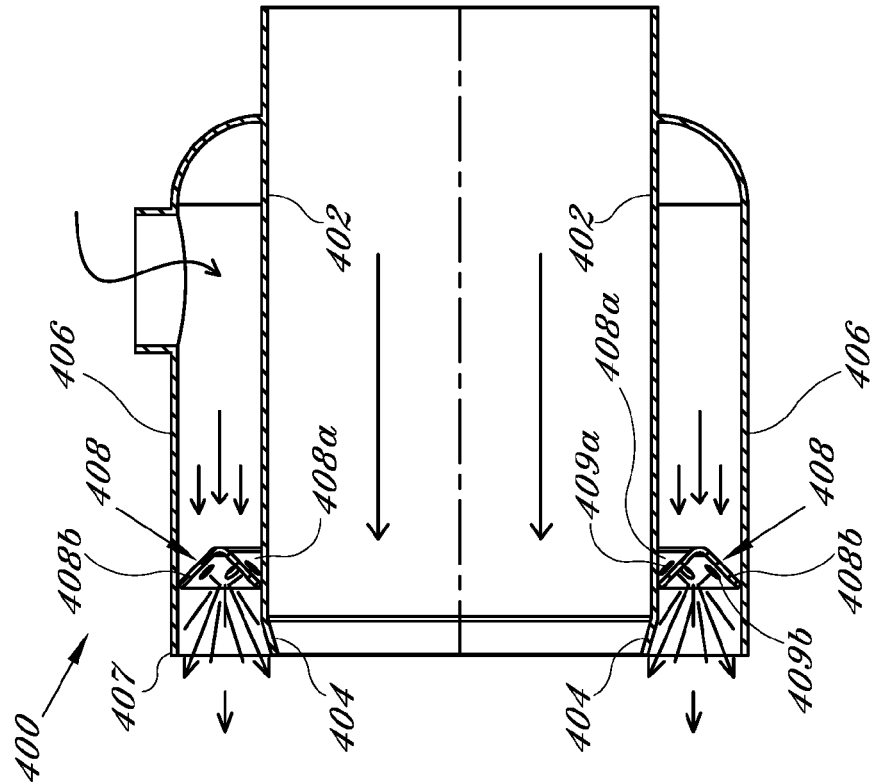
FIG. 16 is a side sectional view thereof taken along section line 16-16 in FIG. 15.
Figure 15:
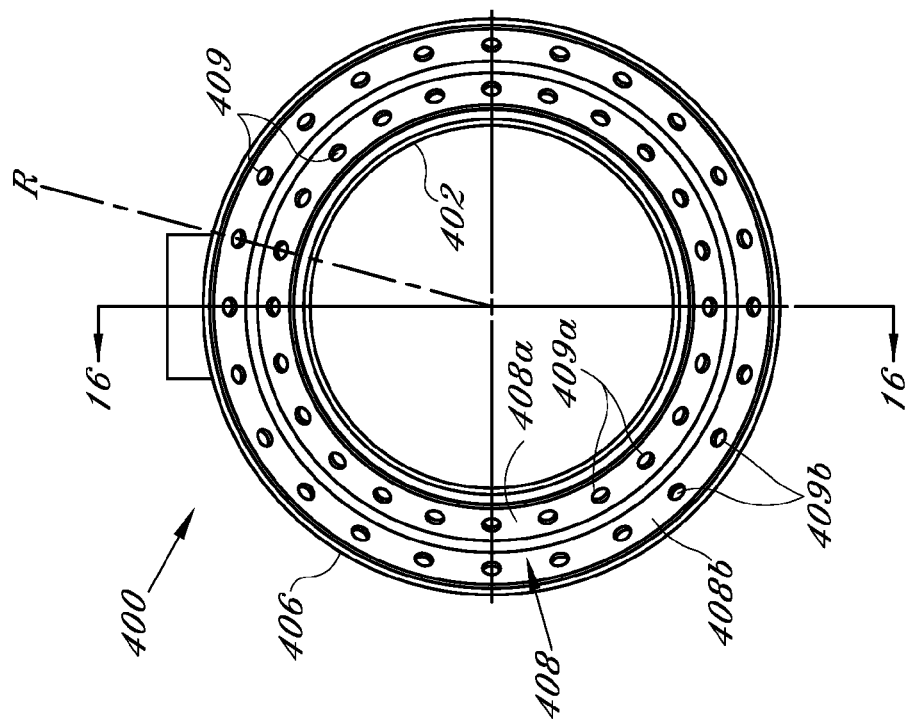
FIG. 15 is a discharge end view of a water jacketed marine exhaust component in accordance with a fifth alternate embodiment.

FIGS. 15 and 16 provide alternate embodiment illustrations for an embodiment similar to the embodiment disclosed in FIGS. 9 and 10, namely a water can having V-shaped spray ring wherein the apex is disposed and/or pointed upstream. FIGS. 15 and 16 depict a water jacketed exhaust component 400 which includes an exhaust pipe, generally referenced as 402, forming an inner liner having a radially inwardly tapered tail end 404, a water jacket 406, having a tail end 407, forming an outer shell disposed in surrounding relation with exhaust pipe 402, and a generally V-shaped spray ring, generally referenced as 408. In this embodiment the apex of the V-shaped spray ring is pointed downstream. V-shaped spray ring 408 comprises an annular structure that defines a generally sideways oriented V-shaped cross-section including a radially inward backward inclined leg 408a and a radially outward forward inclined leg 408b. As best illustrated in FIG. 15, V-shaped spray ring 408, and particularly backward inclined leg 408a and forward inclined leg 408b, defines a plurality of water spray apertures, generally referenced as 409. More particularly, backward inclined leg 408a defines a series of apertures 409a disposed in spaced relation along the circumference thereof, and forward inclined leg 408b defines a series of apertures 409b disposed in spaced relation along the circumference thereof. In this embodiment, each of apertures 409a and 409b are disposed in radially aligned/angularly aligned relation as illustrated by the broken radial reference line "R" in FIG. 15. This configuration has been found to create water flow spray patterns that enhance exhaust gas cooling in certain applications FIGS. 17 and 18 depict a water jacketed exhaust component 500 that includes an exhaust pipe, generally referenced as 502, forming an inner liner having a radially inwardly tapered tail end 504, a water jacket 506, having a tail end 507, forming an outer shell disposed in surrounding relation with exhaust pipe 502, and a generally V-shaped spray ring, generally referenced as 508. In this embodiment the apex of the V-shaped spray ring is pointed downstream. V-shaped spray ring 508 comprises an annular structure that defines a generally sideways oriented V-shaped cross-section including a radially inward backward inclined leg 508a and a radially outward forward inclined leg 508b. As best illustrated in FIG. 17, V-shaped spray ring 508, and particularly backward inclined leg 508a and forward inclined leg 508b, defines a plurality of water spray apertures, generally referenced as 509. More particularly, backward inclined leg 508a defines a series of apertures 509a disposed in spaced relation along the circumference thereof, and forward inclined leg 508*b* defines a series of apertures 509*b* disposed in spaced relation along the circumference thereof. In this embodiment, each of apertures 509*a* and 509*b* are disposed in radially offset/angularly offset relation as illustrated by the broken radial reference lines "R1", "R2" and "R3" in FIG. 17. This configuration has been found to create water flow spray patterns that enhance exhaust gas cooling in certain applications.

Alternate aperture configurations have been found to result in producing greater or less exhaust gas cooling. Configuring the apertures in an angularly aligned configuration (FIGS. 11 and 12) creates different downstream water interaction than configuring the apertures in an angularly offset configuration (FIGS. 13-14). The difference in cooling performance results from the interaction of water flow streams. More particularly, in the diverging spray stream embodiments depicted in FIGS. 11-14, water streams exiting the spray apertures 209*a* (FIG. 11) impact the outer surface of the exhaust pipe whereafter they fan out and eventually collide with adjacent streams thereby breaking up the water into fine particles prior to exiting the device. Similarly spray streams exiting apertures 209*b* impact the inner surface of the water jacket whereafter they fan out and eventually collide with adjacent steams thereby breaking up the water into fine particles prior to exiting the device. In the converging spray stream embodiments depicted in FIGS. 15-18, water streams exiting the spray ring converge, rather than diverge as in the embodiments illustrated in FIGS. 11-14. In the embodiment illustrated in FIGS. 15 and 16 wherein the spray apertures 409*a* and 409*b* are angularly aligned, the respective streams collide shortly after exiting the spray ring thereby breaking the streams up into fine water droplets. In the embodiment illustrated in FIGS. 17 and 18, whein the spray apertures 509*a* and 509*b* are angularly offset the respective streams will impact surfaces, fan out and break up. More particularly, streams exiting apertures 509*a* will impact the inner surface of the water jacket 506, whereas streams exiting apertures 509*b* will impact the outer surface of the exhaust pipe 502. In addition, a further advantage of the present invention involves providing a water jacketed marine exhaust component wherein the spray ring may be installed in a reversible configuration. More particularly, using the same exhaust pipe and water jacket, the V-shaped spray ring may be installed in a first configuration to create diverging spray streams, or alternatively in a second configuration to create converging spray streams. The ability to adapt the exhaust component is most significant in solving excessive exhaust gas temperature problems by removing and reversing the spray ring.

Finally, the present invention may be embodied in a configuration wherein some of the apertures are angularly aligned and some are angularly offset.

FIGS. 19 and 20 depict a water jacketed exhaust component 600 that includes an exhaust pipe, generally referenced as 602, forming an inner liner having a radially inwardly tapered tail end 604, a water jacket 606, having a tail end 607, forming an outer shell disposed in surrounding, relation with exhaust pipe 602, and a generally V-shaped spray ring, generally referenced as 608. In this embodiment the apex of the V-shaped spray ring is pointed downstream. V-shaped spray ring 608 comprises an annular structure that defines a generally sideways oriented V-shaped cross-section including a radially inward forward inclined leg 608*a* and a radially outward backward inclined leg 608*b*. V-shaped spray ring 608, and particularly forward inclined leg 608*a* and backward inclined leg 608*b*, defines a plurality of water spray apertures, generally referenced as 609. More particularly, forward inclined leg 608*a* defines a series of apertures 609*a* disposed in spaced relation along the circumference thereof, and backward inclined leg 608*b* defines a series of apertures 609*b* disposed in spaced relation along the circumference thereof. In this embodiment, some of apertures 609*a* are disposed in angularly offset relation with some of apertures 609*b* as illustrated by the broken radial reference line "R1", and some of apertures 609*a* are disposed in angular alignment with some of apertures 609*b* as illustrated by the broken radial reference line "R2". This configuration has been found to create water flow spray patterns that enhance exhaust cooling in certain applications.

Figure 22:
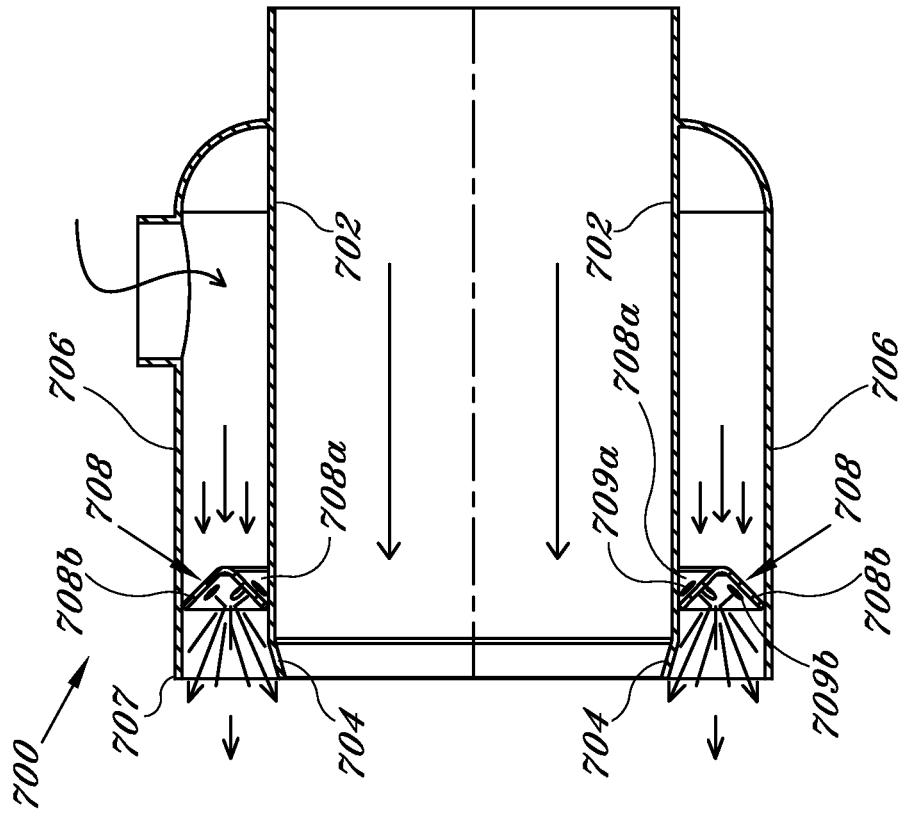
FIG. 22 is a side sectional view thereof taken a on section line 22-22 in FIG. 21.
Figure 21:
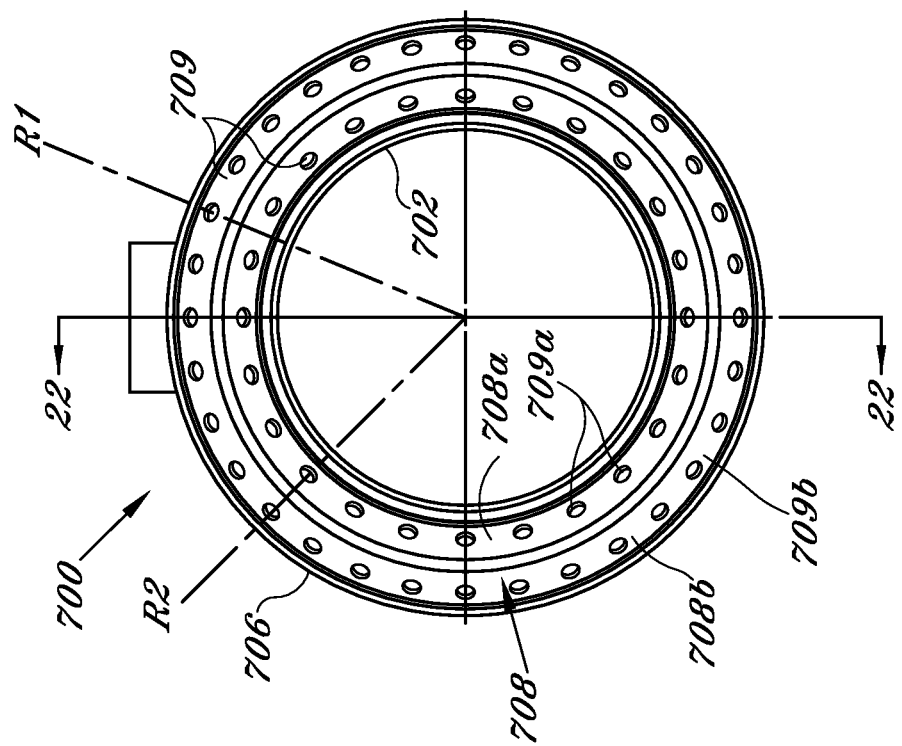
FIG. 21 is a discharge end view of a water jacketed marine exhaust component in accordance with an eighth alternate embodiment.

FIGS. 21 and 22 depict a water jacketed exhaust component 700 that includes an exhaust pipe, generally referenced as 702, forming an inner liner having a radially inwardly tapered tail end 704, a water jacket 706, having a tail end 707, forming an outer shell disposed in surrounding relation with exhaust pipe 702, and a generally V-shaped spray ring, generally referenced as 708. In this embodiment the apex of the V-shaped spray ring is pointed upstream. V-shaped spray ring 708 comprises an annular structure that defines a generally sideways oriented V-shaped cross-section including a radially inward backward inclined leg 708*a* and a radially outward forward inclined leg 708*b*. V-shaped spray ring 708, and particularly backward inclined leg 708*a* and forward inclined 708*b*, defines a plurality of water spray apertures, generally referenced as 709. More particularly, backward inclined leg 708*a* defines a series of apertures 709*a* disposed in spaced relation along the circumference thereof, and forward inclined leg 708*b* defines a series of apertures 709*b* disposed in spaced relation along the circumference thereof. In this embodiment, some of apertures 709*a* are disposed in angularly offset relation with some of apertures 709*b* as illustrated by the broken radial reference line "R1", and some of apertures 709*a* are disposed in angular alignment with some of apertures 709*b* as illustrated by the broken radial reference line "R2". This configuration has been found to create water flow spray patterns that enhance exhaust gas cooling in certain applications.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A water jacketed exhaust pipe for use with marine engines, said water jacketed exhaust pipe comprising:
   an exhaust pipe having a tail end;
   a water jacket disposed in surrounding spaced relation with said exhaust pipe, said water jacket having a tail end;
   an annular spray ring disposed between said exhaust pipe and said water jacket, said spray ring defining a V-shaped cross-section including a forward inclined leg and a backward inclined leg;
   said forward inclined leg including a first plurality of annularly spaced apertures;
   said backward inclined leg including a second plurality of annularly spaced apertures.

2. The water jacketed exhaust pipe according to claim 1, wherein spray ring is configured to create converging streams of cooling water.

3. The water jacketed exhaust pipe according to claim 1, wherein spray ring is configured to create diverging streams of cooling water.

4. The water jacketed exhaust pipe according to claim 1, wherein the tail end of said exhaust pipe is inwardly tapered.

5. A water jacketed exhaust pipe for use with marine engines, said water jacketed exhaust pipe comprising:

an exhaust pipe having a tail end;

a water jacket disposed in surrounding spaced relation with said exhaust pipe, said water jacket having a tail end;

an annular spray ring disposed between said exhaust pipe and said water jacket, said spray ring defining a V-shaped cross-section including a forward inclined leg and a backward inclined leg;

said forward inclined leg including a first plurality of annularly spaced apertures;

said backward inclined leg including a second plurality of annularly spaced apertures; and each of said first plurality of annularly spaced apertures being angularly aligned relative to each of said second set of annularly spaced apertures.

6. The water jacketed exhaust pipe according to claim 5, wherein spray ring is configured to create converging streams of cooling water.

7. The water jacketed exhaust pipe according to claim 5, wherein spray ring is configured to create diverging streams of cooling water.

8. The water jacketed exhaust pipe according to claim 5, wherein the tail end of said exhaust pipe is inwardly tapered.

\* \* \* \* \*